United States Patent
Trump

[11] Patent Number: 6,035,034
[45] Date of Patent: Mar. 7, 2000

[54] DOUBLE TALK AND ECHO PATH CHANGE DETECTION IN A TELEPHONY SYSTEM

[75] Inventor: Tõnu Trump, Stockholm, Sweden

[73] Assignee: Telefonaktiebolaget L M Ericsson (publ), Stockholm, Sweden

[21] Appl. No.: 08/770,908

[22] Filed: Dec. 20, 1996

[51] Int. Cl.[7] .............................. H04M 9/00; H04B 3/20
[52] U.S. Cl. ........................ 379/410; 379/406; 379/411
[58] Field of Search ................. 379/3, 406, 407, 379/409, 410, 411; 370/286, 289, 290, 291

[56] References Cited

U.S. PATENT DOCUMENTS

| | | | |
|---|---|---|---|
| 4,282,411 | 8/1981 | Stewart | 379/406 |
| 4,360,712 | 11/1982 | Horna | 379/406 |
| 4,852,161 | 7/1989 | Hagiwara | 379/410 |
| 4,918,727 | 4/1990 | Rohrs et al. | 379/410 |
| 5,008,923 | 4/1991 | Kitamura et al. | 379/3 |
| 5,193,112 | 3/1993 | Sano | 379/410 |
| 5,263,020 | 11/1993 | Yatsuzuka et al. | 379/410 |
| 5,390,250 | 2/1995 | Janse et al. | 379/410 |
| 5,463,618 | 10/1995 | Furukawa et al. | 379/410 |
| 5,657,384 | 8/1997 | Staudacher et al. | 379/411 |
| 5,661,795 | 8/1997 | Maeda | 379/411 |

FOREIGN PATENT DOCUMENTS

| | | |
|---|---|---|
| 0 439 139 A2 | 1/1991 | European Pat. Off. . |
| 3159423 | 7/1991 | Japan . |
| 7288493 | 10/1995 | Japan . |

OTHER PUBLICATIONS

A Double Talk Detector Based on Coherence Tomas Gänsler, Maria Hannson and Göran Salomonsson Signal Processing Group, Dept. of Elec. Eng. and Comp. Science Lund University, Box 118, S–221 00 Lund, Sweden, IEEE, Nov. 1996.

Echo Canceler with Two Echo Path Models by Kazuo Ochiai, Takashi Araseki and Takashi Ogihara IEEE Transactions on Communications, vol. Com–25, No. 6, Jun. 1977 pp. 589–595.

*Primary Examiner*—Forester W. Isen
*Assistant Examiner*—Jacques M. Saint-Surin
*Attorney, Agent, or Firm*—Jenkens & Gilchrist, P.C.

[57] ABSTRACT

A double talk and echo path change detector is provided for use in an echo canceller that makes a determination about whether a residual signal is dominated by echo or by a "near end" signal. In order to make this determination, a first measure of linear dependency is computed between the residual signal and an echo estimate, and a second measure of linear dependency is computed between the residual signal and a desired signal. The two results are compared with each other, and if they are of about the same order, no further action is needed. However, if the comparison determines that the dependence between the residual signal and the desired signal is much stronger than the dependence between the residual signal and the echo estimate, the present detector assumes that double talk has been detected and a signal denoting that result is output. On the other hand, if the dependence between the residual signal and the desired signal is much weaker than the dependence between the residual signal and the echo estimate, the detector assumes that an echo path change has been detected and a signal denoting that result is output. As such, a reliable and computationally effective method and apparatus are provided to give the echo canceller useful information about double talk and echo path changes that have occurred.

20 Claims, 1 Drawing Sheet

DOUBLE TALK AND ECHO PATH CHANGE DETECTION IN A TELEPHONY SYSTEM

BACKGROUND OF THE INVENTION

1. Technical Field of the Invention

The present invention relates in general to the telecommunications field and, in particular, to echo cancellation in telephony systems.

2. Description of Related Art

"Echo" is a phenomenon that can occur in a telephony system whenever a portion of transmitted speech signal energy is reflected back to a sender. These reflections are caused by impedance mismatches in analog portions of the telephony network. There can be many different sources of echo, such as, for example, a hybrid circuit that converts a 4-wire line to a 2-wire line in a Public Switched Telephone Network (PSTN) subscriber interface, or acoustical crosstalk in a mobile radiotelephone. The presence of echo along with a substantial delay (e.g., physical distance or processing delay) can severely degrade the quality of the speech signals being processed.

An echo canceller is a device that is commonly used in telephony systems to suppress or remove echoes in long distance traffic. For example, in cellular Public Land Mobile Networks (PLMNs), echo cancellers are used in mobile services switching centers (MSCs) to suppress or remove echoes in speech traffic. Echo cancellers are also used in mobile radiotelephones and "handsfree" telephone equipment to compensate for acoustical echoes. A general description of an existing echo cancellation technique can be found in the paper entitled: "A Double Talk Detector Based on Coherence" by Gänsler et al, Signal Processing Group, Dept. of Elec. Eng. and Comp. Science, Lund University, Sweden.

FIG. 1 is a simplified schematic block diagram of a conventional echo canceller (10). The main component of such an echo canceller is an adaptive finite-impulse-response (FIR) filter 12. Under the control of an adaptation algorithm (e.g., in software), filter 12 models the impulse response of the echo path. A non-linear processor (NLP) 14 is used to remove residual echo that may remain after linear processing of the input signal. A double-talk detector (DTD) 16 is used to control and inhibit the adaptation process, when the echo signal to "near end" signal ratio is of such a value that no additional improvement in the echo path estimation can be obtained by further adaptation of filter 12. The block denoted by 18 represents the echo source in the telephony system which generates the "desired" signal, y(t), as a function of the "far end" signal, x(t), and the "near end" signal, v(t).

The quality of the echo path estimation made is determined primarily by the step size used in the adaptation algorithm. In order to obtain a small estimation error, a small step size can be used. However, one result of using a small step size is a slow adaptation rate, and fast adaptation is desired during the initial adaptation stages. A practical trade-off is to use a large step size during the initial adaptation stage (for a high adaptation rate), and after a prescribed period of time, reduce the step size (to obtain a low estimation error).

Any one of a number of existing approaches can be used to solve a double talk detection problem. A standard approach uses an algorithm based on a comparison of signal levels between the "far end" signal, x(t), and the "desired" signal, y(t), shown in FIG. 1. These signal levels, $x_L$ and $y_L$, can be measured by an exponential "windowing" technique and expressed as:

$$x_L(t+1)=(1-\tau)x_L(t)+\tau|x(t)| \quad (1)$$

$$y_L(t+1)=(1-\tau)y_L(t)+\tau|y(t)| \quad (2)$$

Double talk is assumed to be present if the "desired" signal level, $y_L(t)$, exceeds the maximum "far end" signal level multiplied by the expected hybrid circuit attenuation, inside a window "length" that is equal to the filter "length". In other words, double talk is assumed to be present if:

$$y_L(t) \geq \alpha(\max)\{x_L(t), \ldots, x_L(t-N)\} \quad (3)$$

Typically, a hybrid circuit with 6 dB attenuation is assumed, so $\alpha$ is equal to ½.

Another approach used to solve a double talk problem is to determine if there is any linear dependence between the "far end" and "desired" signals. If there is a large amount of linear dependence between the two signals, it is assumed that the "desired" signal is dominated by echo, and the FIR filter (12) adaptation is advanced. If little or no linear dependence between the two signals is found, then it is assumed that double talk is present and the FIR filter (12) adaptation is inhibited.

An important performance characteristic of a double talk detector is that it should be capable of distinguishing between actual double talk and a change in the echo path impulse response (referred to hereafter as "echo path change"). Notably, both double talk and echo path changes appear as increases in residual echo power. However, the two results require opposite adaptation actions. For example, when double talk is present, the adaptation process should be inhibited, but when the echo path is changed, the adaptation rate should be increased so the FIR filter (12) can quickly model the new signal environment. Unfortunately, the existing double talk detection approaches do not provide useful information about echo path changes.

SUMMARY OF THE INVENTION

It is an object of the present invention to distinguish between double talk and echo path changes in a telephony network.

It is another object of the present invention to provide reliable and useful information about double talk and echo path changes for echo cancellation purposes.

It is yet another object of the present invention to provide a computationally effective method for providing an echo canceller with useful information about double talk and echo path changes for echo cancellation purposes.

It is still another object of the present invention to provide a digital method for implementing double talk and echo path change detection.

In accordance with the present invention, the foregoing and other objects are achieved by a double talk and echo path change detector that determines whether a residual signal is dominated by echo or by a "near end" signal. In order to make this determination, a first measure of linear dependency is computed between the residual signal and an echo estimate, and a second measure of linear dependency is computed between the residual signal and a desired signal. The two results are compared with each other, and if they are of about the same order, no further action is needed. However, if the comparison determines that the dependence between the residual signal and the desired signal is much stronger than the dependence between the residual signal and the echo estimate, the present detector assumes that double talk has been detected and an appropriate signal denoting that result is output. On the other hand, if the dependence between the residual signal and the desired signal is much weaker than the dependence between the residual signal and the echo estimate, the detector assumes that an echo path change has been detected and an appropriate signal denoting that result is output. As such, a reliable and computationally effective method and apparatus are provided to give an echo canceller useful information about double talk and echo path changes that have occurred.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
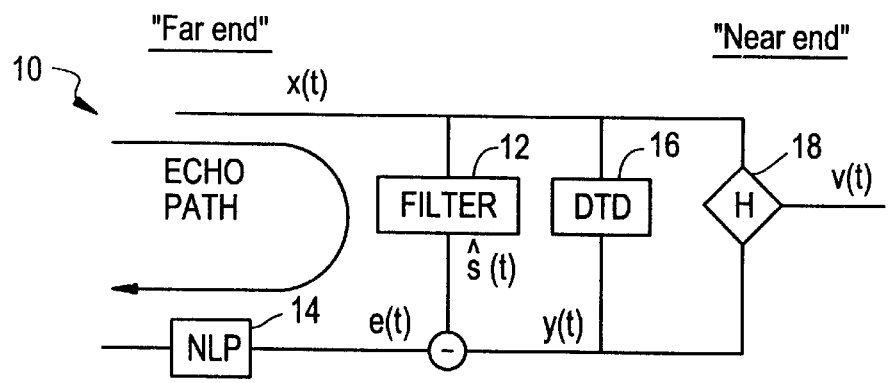
FIG. 1 is a simplified schematic block diagram of a conventional echo canceller.
Figure 2:
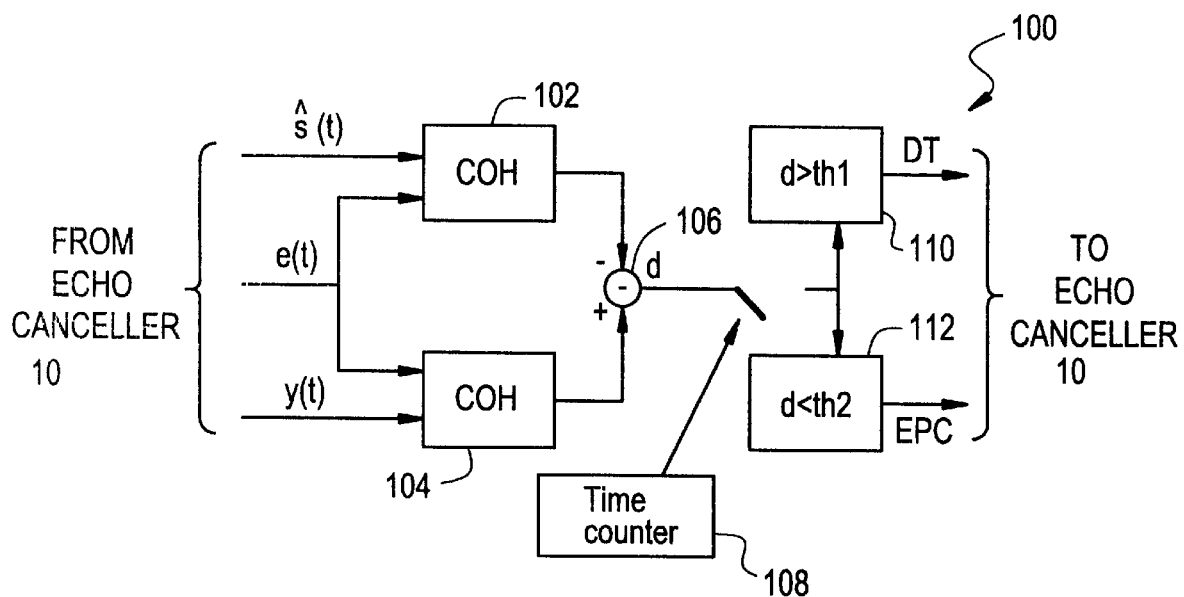
FIG. 2 is a schematic block diagram of a double talk and echo path change detector, which can be used to implement the apparatus and method of the present invention.

The preferred embodiment of the present invention and its advantages are best understood by referring to FIGS. 1–2 of the drawings, like numerals being used for like and corresponding parts of the various drawings.

Essentially, in accordance with the present invention, a double talk and echo path change detector is provided, which functions based on making a determination about whether the residual signal, e(t), is dominated by echo or the "near end" signal. In order to make this determination, a measure of linear dependency is computed between the residual signal, e(t), and the echo estimate, s^(t), on the one side, and between the residual signal, e(t), and the desired signal, y(t), on the other side. The two resulting measurements are then compared with each other, and if they are of about the same order, no further action is taken. However, if the comparison determines that the dependence between e(t) and y(t) is much stronger than the dependence between e(t) and s^(t), then double talk is detected. On the other hand, if the dependence between e(t) and y(t) is much weaker than the dependence between e(t) and s^(t), then an echo path change is detected. Albeit, these determinations are made only if the signals being processed have a significant amount of power.

A linear dependence measurement can be obtained by considering the coherence function, $\gamma^2_{xy}(f)$ between the two stationary random processes, x(t) and y(t), which is defined by:

$$\gamma^2_{xy}(f) = \frac{|S_{xy}(f)|^2}{S_{xx}(f)S_{yy}(f)} \qquad (4)$$

where $S_{xy}(f)=1/T^*E[X^*(f)Y(f)]$ is the cross-spectral density between x(t) and y(t), and $S_{xx}(f)$ and $S_{yy}(f)$ are the corresponding auto-spectral densities. The coherence function is a measure of a possible linear relationship between the stationary random processes involved, and it is bounded between zero and one. If a perfect linear relationship exists between those stationary random processes for some frequency, then the coherence will be equal to unity at that frequency. If no such linear relationship exists, then the coherence function will be equal to zero. A scalar linear dependence measure can be obtained by computing a mean value for the coherence function.

An approach that can be used to detect echo path changes is based on the observation that under the principle of orthogonality, there can be no linear relationship between the residual signal, e(t), and the echo estimate, s^(t), if the echo estimate is produced by an optimal estimator and, therefore, the coherence function is equal to zero. Using an adaptive algorithm with a FIR filter to model the echo path, the coherence function will be close to zero if the adaptive algorithm is converged. However, if an echo path change occurs, a strong linear relationship will appear between the signals, e(t) and s^(t), and therefore, the coherence function will be large.

Considering the coherence between the desired signal, y(t), and the residual signal, e(t), if the adaptive algorithm is converged and the "near end" signal, v(t), is weak, the coherence function will be small. If the "near end" signal is strong, then the residual signal is dominated by the "near end" component, v(t), and the coherence function will be close to unity. Notably, if the FIR filter's coefficients are initialized to zero, then a linear relationship will exist between the residual signal and the desired signal during the initial adaptation stage.

In order to detect both double talk and echo path changes, the following test variable (d) can be used:

$$d = \frac{1}{f_2 - f_1}\int_{f_1}^{f_2} \gamma^2_{ye}(f)df - \frac{1}{f_2 - f_1}\int_{f_1}^{f_2} \gamma^2_{se}(f)df \qquad (5)$$

where $f_1$ and $f_2$ are the borders of the frequency band of interest. The value of the test variable, d, will be close to zero during normal operation of the detector (e.g, no double talk or echo path change detected). However, test variable d will be close to unity when double talk is detected, and it will go negative if an echo path change is detected. Consequently, in accordance with the present invention, the adaptive algorithm used for a FIR filter in an echo canceller (e.g., filter 12) can compare the test variable, d, with two predetermined threshold levels, th1 and th2, where 0<th1<1, and −1<th2<0. If the test variable d>th1, then it is assumed that double talk has been detected. If d<th2, then it is assumed that an echo path change has been detected. The absolute values of th1 and th2 can be used to control the sensitivity of the detector. In the preferred embodiment, the threshold level are set at th1=0.8 and th2=−0.5.

FIG. 2 is a schematic block diagram of a double talk and echo path change detector, which can be used to implement the apparatus and method of the present invention. Detector 100 includes a first coherence measurement unit 102 and second coherence measurement unit 104. First coherence measurement unit 102 computes the linear dependency between the residual signal, e(t), and the echo path estimate, s^(t). Second coherence measurement unit 104 computes the linear dependency between the residual signal, e(t), and the desired signal, y(t). The output of each of the two measurement units is compared at comparator 106. This comparison is accomplished in accordance with Equation 5 described above. The output of comparator 106 is coupled to an input of a first test unit 110 and a second test unit 112. First test unit 110 compares the output value (e.g., test variable d) of comparator 106 with a first predetermined threshold level, th1. Second test unit 112 compares the output value (d) of comparator 106 with a second predetermined threshold value, th2. As described above, the value of test variable, d, is close to zero during a normal operation, and no filter adaptation occurs. If, however, the value of test variable, d, is greater than threshold level th1, then first test unit 110 outputs a signal (preferably to an appropriate stage in echo canceller 12) denoting that double talk has been detected. Consequently, the adaptive algorithm for the FIR filter (12) is inhibited.

If the value of test variable, d, is less than threshold level th2, then second test unit 112 outputs a signal (preferably to an appropriate stage in echo canceller 12) denoting that an echo path change has been detected. Consequently, the adaptive algorithm for the FIR filter (12) is advanced. A timer 108 is used to decouple the output of comparator 106 to ensure that the filter adaptation process occurs during the initial test period. For this embodiment, timer 108 is set for about 20 times the "length" of the FIR filter used.

In a digital implementation of the preferred embodiment, the coherence functions can be estimated by replacing the mathematical expectations with time averages, and computing the spectra by using discrete Fourier transforms (or some other orthogonal transform). The integration performed above in Equation 5 can be replaced by summation over discrete frequencies.

Specifically, since a detected echo path change is compensated for by an adaptive algorithmic process over a period of time, it is preferable to select relatively short window lengths. Consequently, for the preferred embodiment, the adaptive algorithm computes the coherence functions using an 8-point Fast Fourier Transform (FFT). However, the present invention is not intended to be limited to any specific FFT value, and any appropriate value (e.g., any other positive value) can be used instead of "8". Preferably, positive values should be used that allow the use of FFT algorithms (e.g., powers of 2). In this embodiment, time averaging is performed over 64 consecutive transforms, which overlap in seven samples (using a sliding rectangular window). Notably, however, other types of windows may be used for averaging (e.g., an exponential window).

In solving these echo cancellation problems, the signals involved are real signals, and consequently, the real parts of their Fourier transforms are symmetric and the imaginary parts are asymmetric. Consequently, for this embodiment, an N×N transform matrix for N=8 can be defined as:

$$F = \begin{bmatrix} c_{00} & c_{01} & c_{02} & c_{03} & c_{04} & c_{05} & c_{06} & c_{07} \\ c_{10} & c_{11} & c_{12} & c_{13} & c_{14} & c_{15} & c_{16} & c_{17} \\ c_{20} & c_{21} & c_{22} & c_{23} & c_{24} & c_{25} & c_{26} & c_{27} \\ c_{30} & c_{31} & c_{32} & c_{33} & c_{34} & c_{35} & c_{36} & c_{37} \\ c_{40} & c_{41} & c_{42} & c_{43} & c_{44} & c_{45} & c_{46} & c_{47} \\ s_{30} & s_{31} & s_{32} & s_{33} & s_{34} & s_{35} & s_{36} & s_{36} \\ s_{20} & s_{21} & s_{22} & s_{23} & s_{24} & s_{25} & s_{26} & s_{27} \\ s_{10} & s_{11} & s_{12} & s_{13} & s_{14} & s_{15} & s_{16} & s_{17} \end{bmatrix} \quad (6)$$

where $c_{nk} = \cos 2\pi nk/N$ and $s_{nk} = \sin 2\pi nk/N$. Substituting these values for $c_{nk}$ and $s_{nk}$ in the matrix of Equation 6, the following values are obtained:

$$F = \begin{bmatrix} 1 & 1 & 1 & 1 & 1 & 1 & 1 & 1 \\ 1 & c & 0 & -c & -1 & -c & 0 & c \\ 1 & 0 & -1 & 0 & 1 & 0 & -1 & 0 \\ 1 & -c & 0 & c & -1 & c & 0 & -c \\ 1 & -1 & 1 & -1 & 1 & -1 & 1 & -1 \\ 0 & -c & 1 & -c & 0 & c & -1 & c \\ 0 & -1 & 0 & 1 & 0 & -1 & 0 & 1 \\ 0 & -c & -1 & -c & 0 & c & 1 & c \end{bmatrix} \quad (7)$$

where $c = \sqrt{2}/2$.

The transform of the last N samples of signal x, $x(t) = [x(t), \ldots, x(t-N+1)]^T$, is given by a matrix vector multiplication $Fx(t)$. The discrete coherence function can be defined in this transform domain, by replacing $S_{xy}$ with diagonal elements of:

$$U_{xy}(t) = E[\text{diag}(Fx(t)\text{diag}(Fy(t)))], \quad (8)$$

where the diag() operator forms a diagonal matrix from the argument vector.

Denoting the vector of the diagonal elements of $U_{xy}(t)$ by $u_{xy}(t)$, an element of the discrete coherence vector can be defined as:

$$\gamma(n) = \frac{|u_{xy}(n)|^2}{u_{xx}(n)u_{yy}(n) + a} \quad (9)$$

where a is a regularization constant, which controls errors in division when the denominator otherwise is small. The regularization constant can be a design variable that allows a measure of control over the detector's sensitivity. The value of the regularization constant is preferably comparable to the fourth power of the signal levels expected.

The coherence vector described by Equation 9 results from an element-wise division of vectors, the elements of which have dimensions of the fourth powers of the corresponding signals. In other words, the dynamic range of these elements is four times greater than that of the signals involved. This result may be undesirable if the above-described math is to be implemented with fixed point arithmetic. Consequently, the following normalization vector may be used instead:

$$\gamma_1(n) = \frac{|u_{xy}(n)|}{u_{xx}(n) + u_{yy}(n) + a_1} \quad (10)$$

The value of the regularization constant, $a_1$, should be selected to be comparable to the power levels of the signals expected to be involved.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A double talk and echo path change detector, comprising:

a first measurement unit for determining a first linear dependency between a first input signal and a second input signal;

a second measurement unit for determining a second linear dependency between said first input signal and a third input signal;

a comparator for comparing said first linear dependency with said second linear dependency, and generating an output signal; and a threshold unit for comparing said output signal with a first predetermined threshold level and a second predetermined threshold level and thereby indicating an occurrence of double talk and echo path change, respectively.

2. The double talk and echo path change detector of claim 1, wherein said first measurement unit comprises a coherence function measurement unit.

3. The double talk and echo path change detector of claim 1, wherein said second measurement unit comprises a coherence function measurement unit.

4. The double talk and echo path change detector of claim 1, wherein said first input signal comprises a residual signal.

5. The double talk and echo path change detector of claim 1, wherein said second input signal comprises an echo estimation signal.

6. The double talk and echo path change detector of claim 1, wherein said third input signal comprises a desired signal.

7. The double talk and echo path detector of claim 1, further comprising a timer for decoupling a signal between said comparator and said threshold unit during a predetermined period of time.

8. A method for detecting double talk and an echo path change in a telephony network, comprising the steps of:

computing a first linear dependency between a first input signal and a second input signal;

computing a second linear dependency between said first input signal and a third input signal;

comparing said first linear dependency with said second linear dependency and generating an output signal based on said comparing; and comparing said output signal with a first predetermined threshold level and a second predetermined threshold level and thereby indicating an occurrence of double talk and echo path change, respectively.

9. The method of claim 8, wherein said step of computing a first linear dependency comprises the step of computing a first coherence function.

10. The method of claim 8, wherein said step of computing a second linear dependency comprises the step of computing a second coherence function.

11. The method of claim 8, wherein said output signal comprises a test variable.

12. The method of claim 8, wherein said first input signal comprises a residual signal, said second input signal comprises an echo estimation signal, and said third input signal comprises a desired signal.

13. A method for detecting double talk and an echo path change in a telephony network, comprising the steps of:

computing a first linear dependency between a first input signal and a second input signal;

computing a second linear dependency between said first input signal and a third input signal;

comparing said first linear dependency with said second linear dependency and generating an output signal based on said comparing; and comparing said output signal with a first predetermined threshold level and a second predetermined threshold level and thereby indicating an occurrence of at least one of a double talk condition, an echo path change condition, and a neither double talk nor echo path change condition.

14. The method of claim 13, wherein said step of comparing said output signal with a first predetermined threshold level and a second predetermined threshold level and thereby indicating an occurrence of at least one of a double talk condition, an echo path change condition, and a neither double talk nor echo path change condition further comprises the steps of:

determining whether said output signal is greater than said first predetermined threshold level;

if so, indicating said occurrence of said double talk condition;

if not, determining whether said output signal is less than said second predetermined threshold level;

if so, indicating said occurrence of said echo path change condition;

otherwise, indicating said occurrence of said neither double talk nor echo path change condition.

15. The method of claim 13, wherein said first input signal comprises a residual signal, said second input signal comprises an echo estimation signal, and said third input signal comprises a desired signal.

16. The method of claim 13, wherein said step of computing a first linear dependency further comprises the step of computing a first coherence function and wherein said step of computing a second linear dependency further comprises the step of computing a second coherence function.

17. The method of claim 16, wherein said step of computing a first coherence function further comprises the step of estimating said first coherence function by utilizing time averages and by applying orthogonal transforms and wherein said step of computing a second coherence function further comprises the step of estimating said second coherence function by utilizing time averages and by applying orthogonal transforms.

18. The method of claim 16, wherein at least one of said steps of computing a first coherence function and computing a second coherence function further comprise the step of employing a regularization constant to control sensitivity.

19. The method of claim 18, wherein said step of employing a regularization constant to control sensitivity further comprises the step of selecting said regularization constant so as to be comparable to power levels in said telephony network.

20. The method of claim 13, wherein said step of indicating an occurrence of at least one of a double talk condition, an echo path change condition, and a neither double talk nor echo path change condition further comprises the step of indicating said occurrence to an associated echo canceller.

* * * * *

UNITED STATES PATENT AND TRADEMARK OFFICE
CERTIFICATE OF CORRECTION

PATENT NO. : 6,035,034
DATED : March 7, 2000
INVENTOR(S) : Tõnu Trump

It is certified that error appears in the above-indentified patent and that said Letters Patent is hereby corrected as shown below:

Column 3, line 58   Delete "$S_{zy}(f)=1/T*E[X*(f)Y(f)]$"
Replace with --$S_{zy}(f)=1/T*E[X^*(f)Y(f)]$--

Column 5, line 59   Delete "$S_{36} \ S_{36}$"
Replace with --$S_{36} \ S_{37}$--

Signed and Sealed this

Tenth Day of April, 2001

Attest:

NICHOLAS P. GODICI

Attesting Officer    Acting Director of the United States Patent and Trademark Office